United States Patent
Jeon

(10) Patent No.: US 6,912,218 B1
(45) Date of Patent: Jun. 28, 2005

(54) MPEG TRANSPORT STREAM ENCODER AND METHOD FOR ENCODING MPEG TRANSPORT STREAM

(75) Inventor: Jong-gu Jeon, Kyungki-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 1150 days.

(21) Appl. No.: 09/676,987

(22) Filed: Oct. 2, 2000

(30) Foreign Application Priority Data

Oct. 1, 1999 (KR) .......................................... 99-42309

(51) Int. Cl.[7] .................................................. H04J 3/24
(52) U.S. Cl. ...................... 370/392; 370/473; 370/474
(58) Field of Search ................................ 370/474, 473, 370/392, 365; 375/240

(56) References Cited

U.S. PATENT DOCUMENTS

| | | | |
|---|---|---|---|
| 5,521,927 A | 5/1996 | Kim et al. | |
| 5,598,415 A | * 1/1997 | Nuber et al. | ................. 370/474 |
| 5,838,678 A | * 11/1998 | Davis et al. | ................. 370/389 |
| 6,188,703 B1 | * 2/2001 | Dobson et al. | ............. 370/537 |

FOREIGN PATENT DOCUMENTS

| | | | | |
|---|---|---|---|---|
| EP | 0 753 954 A2 | 1/1997 | ........... | H04L/29/06 |
| EP | 0 928 111 A2 | 7/1999 | ............ | H04N/7/30 |
| EP | 0 932 307 A2 | 7/1999 | ............ | H04N/7/52 |
| EP | 0 939 498 A2 | 9/1999 | ............ | H04B/1/66 |
| JP | 9-9215 A | 1/1997 | | |

OTHER PUBLICATIONS

ISO Bulletin; The MPEG generation New information–age elements; Leonardo Chiariglione; Sep. 2000.

* cited by examiner

Primary Examiner—Chau Nguyen
Assistant Examiner—Blanche Wong
(74) Attorney, Agent, or Firm—Sughrue Mion, PLLC

(57) ABSTRACT

A TS encoder for encoding video and audio signals in units of fields is provided. A transport stream (TS) encoding method for receiving an MPEG elementary stream and generating a transport stream includes the steps of (a) generating a packetized elementary stream (PES) header in units of fields of the elementary stream, (b) generating a PES header valid period signal for denoting the valid period of the PES header generated in the step (a) in units of fields, (c) recording the PES header generated in the step (a) and the elementary stream in synchronization with the PES header valid period signal generated in the step (b), (d) generating a TS header period signal for denoting a period in which the TS header is to be recorded, (e) reading the PES header generated in the step (a) and the elementary stream in synchronization with the TS header period signal generated in the step (d), and (f) generating the TS packet by adding the TS header to the PES header read in the step (a) and to the elementary stream, according to the timing at which the TS header is to be recorded.

10 Claims, 4 Drawing Sheets

MPEG TRANSPORT STREAM ENCODER AND METHOD FOR ENCODING MPEG TRANSPORT STREAM

BACKGROUND OF THE INVENTION

1. Field of the Invention

The present invention relates to a moving picture experts group (MPEG) system, and more particularly, to a transport stream (TS) encoder for encoding an elementary stream in units of fields in the MPEG-2 and a method therefor. The present application is based on Korean Patent Application No. 99,42309, filed Oct. 1, 1999, which is incorporated herein by reference.

2. Description of the Related Art

The MPEG-2 system specifies the syntax of MPEG audio and video streams. The MPEG system has two types of methods. One, which is referred to as a program stream (PS), is for constructing a program. The other, which is referred to as a transport stream (TS), is for constructing a plurality of programs.

A multiplexing method by a packet is adopted in the MPEG system. Namely, the MPEG system segments a video/audio elementary stream (ES) into a bit stream in units of packets and multiplexes the video/audio elementary stream along with additional information such as a header. At this time, information of distinguishing a video packet from an audio packet is included in the header. The length of the packet is set to be $2^{16}$ (64 KB) in the MPEG system in order to be suitable for various applications. For flexibility, each packet can have a fixed length or a variable length. Information on the length of the packet is included in the header.

In the PS method, a plurality of packets (referred to as a packetized elementary stream (PES) in the MPEG-2) are grouped to construct a pack. In the TS method, a PES is re-segmented and a plurality of transport stream (TS) packets having a relatively short length are constituted. At this time, the length of a TS packet is 188 bytes and each TS packet is divided into four ATM cells and then transmitted.

A header of four bytes exists in the TS packet. A packet ID (PID) which identifies the packet exists in the header. The PID is written in a program management table (PMT) of program specific information (PSI). The TS packet whose PID is "0" is used for transmitting the PSI.

Information on programs to which each of the TS packets belongs is required since the TS transmits a plurality of programs. This information is referred to as the PSI. The PSI is transmitted by the TS packet having a designated ID and a packet designated by a primitive PSI. The PSI packet consists of a PAT, a PMT, and a conditional access table (CAT). The PSI information is transmitted at least once within 0.7 seconds.

The PAT records information on a program and includes the PID of the packet including the PMT.

A continuity counter for examining the continuity of packets having the same PID is included in the header.

The TS encoder re-segments the PES packet and constructs the TS packet. The length of the PES packet is not fixed and the PES packet includes 16 bit header information so that the length thereof can be shown.

In conventional technology, the TS packet is formed by multiplexing a plurality of programs. Accordingly, when one program is multiplexed, hardware becomes complicated. Also, when the TS packet is constituted in units of frames, it is not possible to desirably edit or re-construct the TS packet. This is because it is difficult to re-construct information on a desired frame since the PSI information exists once every 0.7 seconds.

SUMMARY OF THE INVENTION

To solve the above problem, it is an object of the present invention to provide an encoder for generating a transport stream (TS) packet by constructing one packetized elementary stream (PES) packet to be one field and inserting a program clock reference (PCR) into the TS packet in units of fields, and an encoding method therefor.

To achieve the above object, there is provided a transport stream (TS) encoder for receiving an MPEG elementary stream and generating a transport stream, comprising a PES header generator for generating a PES header in units of fields of the elementary stream, a control signal generator for generating a PES header valid period signal that shows the valid period of the PES header in units of fields, a memory for recording and reading the PES header generated by the PES header generator and the elementary stream, a memory controller for controlling the recording operation of the memory in synchronization with the PES header valid period signal generated by the control signal generator and generating a TS header period signal that shows a period in which a TS header is to be recorded, a flag generator for controlling the reading operation of the memory in synchronization with the TS header period signal generated by the memory controller and generating a TS header flag that shows timing at which the TS header is to be recorded, and a TS packet generator for adding the TS header to data read from the memory in synchronization with the TS header flag and outputting a TS packet.

To achieve the above object, there is provided a transport stream (TS) encoding method for receiving an MPEG elementary stream and generating a transport stream, comprising the steps of (a) generating a packetized elementary stream (PES) header in units of fields of the elementary stream, (b) generating a PES header valid period signal for denoting the valid period of the PES header generated in the step (a) in units of fields, (c) recording the PES header generated in the step (a) and the elementary stream in synchronization with the PES header valid period signal generated in the step (b), (d) generating a TS header period signal for denoting a period in which the TS header is to be recorded, (e) reading the PES header generated in the step (a) and the elementary stream in synchronization with the TS header period signal generated in the step (d), and (f) generating the TS packet by adding the TS header to the PES header read in the step (a) and to the elementary stream, according to the timing at which the TS header is to be recorded.

BRIEF DESCRIPTION OF THE DRAWING(S)

The above object and advantages of the present invention will become more apparent by describing in detail a preferred embodiment thereof with reference to the attached drawings in which.

DESCRIPTION OF THE PREFERRED EMBODIMENTS

Figure 1:
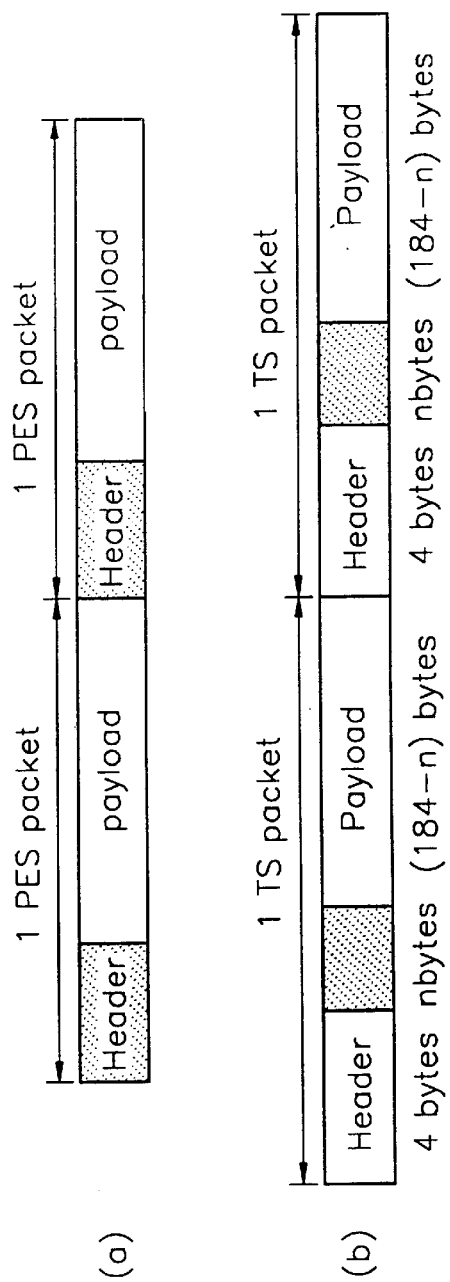
FIGS. 1A and 1B show the structures of a packetized elementary stream (PES) packet and a transport stream (TS) packet of the MPEG-2, respectively.

FIGS. 1A and 1B show the structures of a packetized elementary stream (PES) packet and a transport stream (TS) packet, respectively. The PES packet and the TS packet shown in FIGS. 1A and 1B are specified in the ISO/IEC 13818-1 which is a specification related to the system of the MPEG-2.

One PES packet consists of a header and a payload and the length thereof is variable. Information on the length of the PES packet is included in the header.

One TS packet consists of a header of four bytes and an adaptation field of n bytes, and a payload of (184-n) bytes and the total length thereof is 188 bytes.

Figure 2:
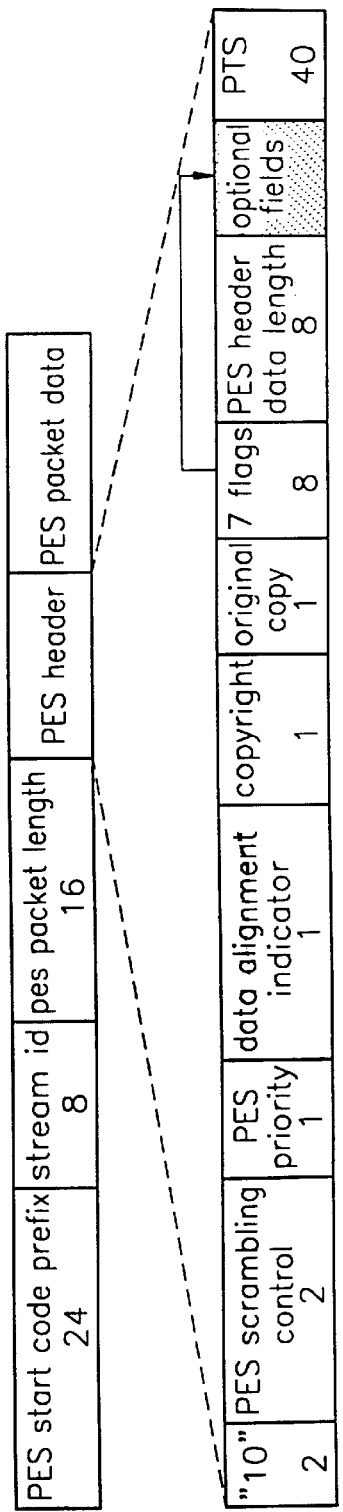
FIG. 2 shows the detailed structure of the PES packet shown in FIG. 1.

FIG. 2 shows the detailed structure of the PES packet shown in FIG. 1A.

In the PES packet shown in FIG. 2, the contents of the respective elements are as follows.

pes start code prefix→"0x000001"

stream id→"1110 xxxxx": ISO/IEC 11172-2 video stream number xxxx

"110x xxxxx": ISO/IEC 11172-3 audio stream number xxxx pes packet length→"0x00": the length of the PES packet is not specified.

pes scrambling control→"00"

pes priority→"1"

data alignment indicator→"0"

copy right→"0"

PTS DTS flag→"10"

ESCR FLAG→"0": Elementary Stream Clock Reference Flag

ES rate flag→"0"

DSM trick mode flag→"0": Digital Storage Media trick mode flag additional copy info flag→"0"

PES CRC flag→"0"

PES extension flag→"0"

PES header data length→"0x05"

PTS→"0x xxxx xxxx xxxx xx (5 bytes)": Program Time Stamp

Figure 3:
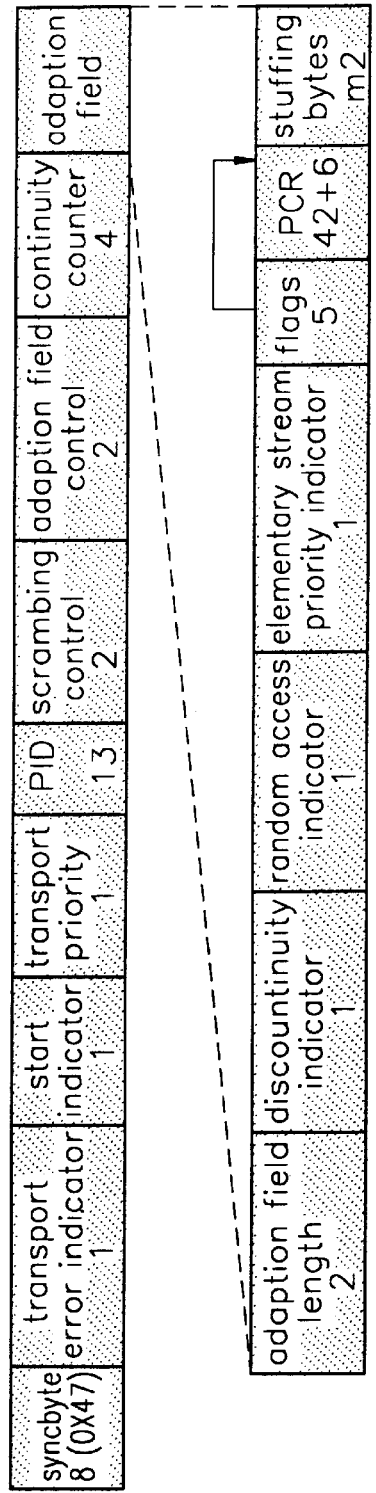
FIG. 3 shows the detailed structure of the TS packet shown in FIG. 1.

In the TS packet shown in FIG. 3, the respective elements are as follows.

syncbyte→"0x47"

transport error indicator"0"

payload unit start indicator→"0"

transport priority→"0"

PID→"1 1111 1111 1111"

transport scrambling control→"00"

adaptation field control→"01"

continuity counter→"00"

adaptation field

Figure 4:
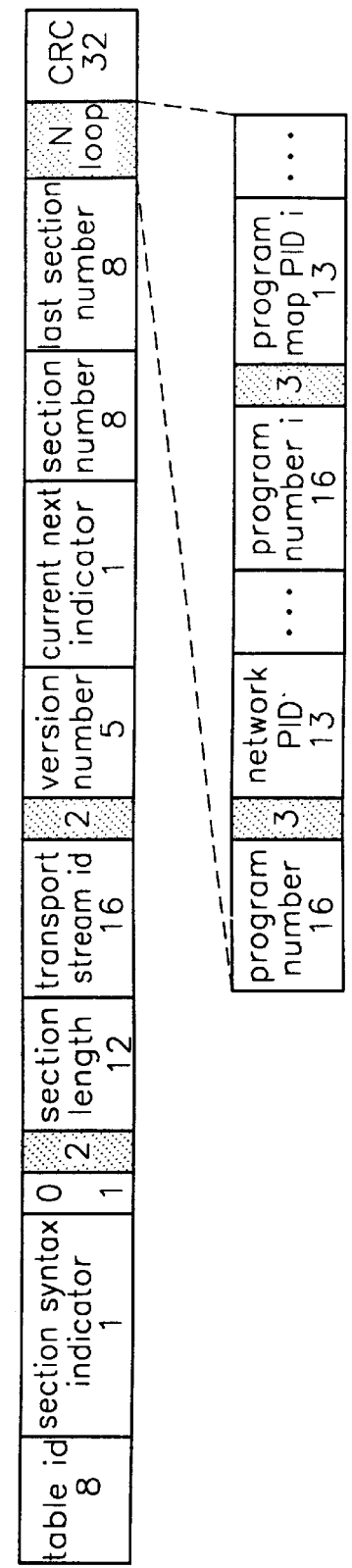
FIG. 4 shows the detailed structure of a PAT packet.

FIG. 4 shows the detailed structure of the PAT packet.

The PAT packet is specific information transmitted by PID="0". A program map table for describing the elements of a program is transmitted to each program number (16 bits). The contents of the respective elements shown in FIG. 4 are as follows.

table id→"0x00"

section syntax indicator→"1"

"0"

reserved→"11"

section length→"0x0d"

transport stream id→"0x01": this can be re-defined by a user.

reserved→"11"

version number→"0x00"

current next indicator→"1"

section number→"0x00"

program number→an external input program number designated by a user reserved→"111"

program map PID→ external input PMT_PID

Figure 5:
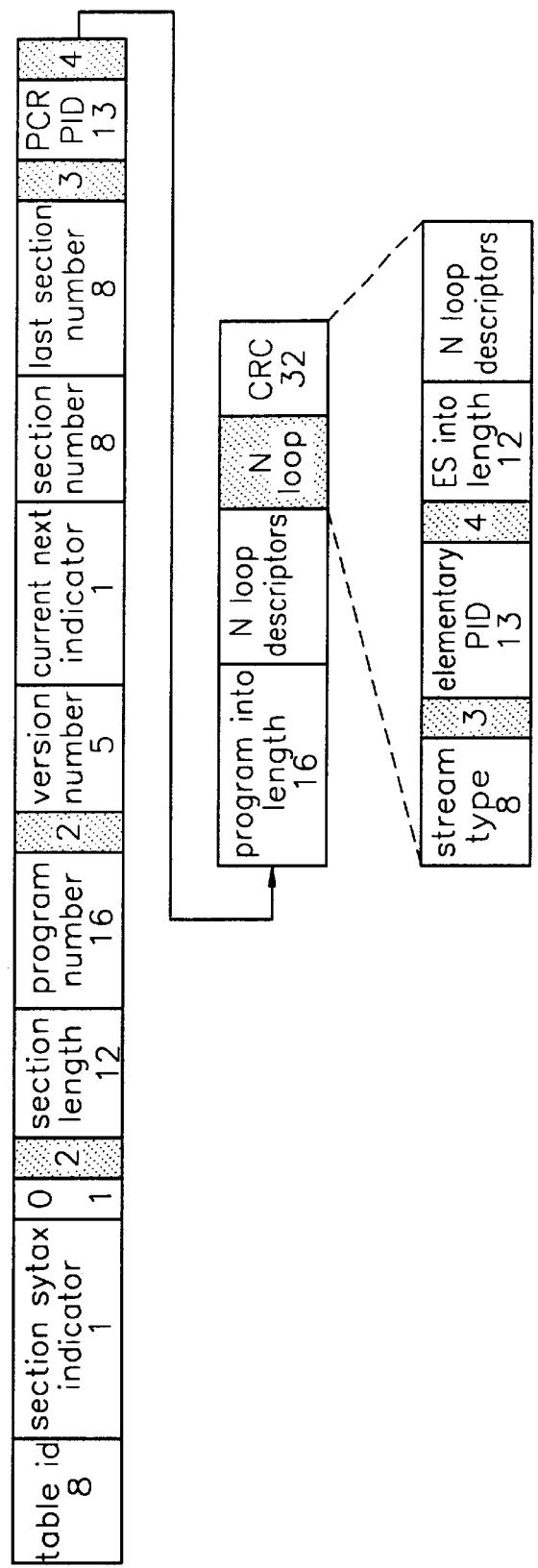
FIG. 5 shows the detailed structure of a PMT packet.

FIG. 5 shows the PMT packet in detail. The PMT describes the PID list and the additional information of a transport packet that constructs a program identification number and a program.

The contents of the elements shown in FIG. 5 are as follows.

table id→"0x02"

section syntax indicator→"1"

"0"

reserved→"11"

section length→"0x0d"

program number→"0x01": this can be re-defined by a user.

reserved→"11"

version number→"0x0"

current next indicator→"1"

section number→"0x00"

last section number: "0x00"

reserved→"1111"

PCR PID→external input PCR PID 13 bits reserved→"1111"

program info length→"0x000"

stream type→a stream type is assigned according to the MPEG table 2–36 reserved→"111"

elementary PID→external input VTS PID reserved→"0xf"

Figure 6:
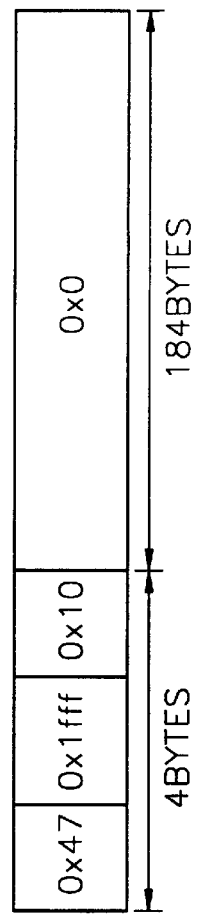
FIG. 6 shows the structure of a null packet.

FIG. 6 shows the structure of a null packet. A TS encoder can basically multiplex a plurality of programs. For example, the TS encoder transmits a null packet (4 bytes+ 184 bytes) while the video and audio are not transmitted since the video is 9 Mbps and the audio is 384 Kbps in general when the transmission speed is 60 Mbps.

Figure 7:
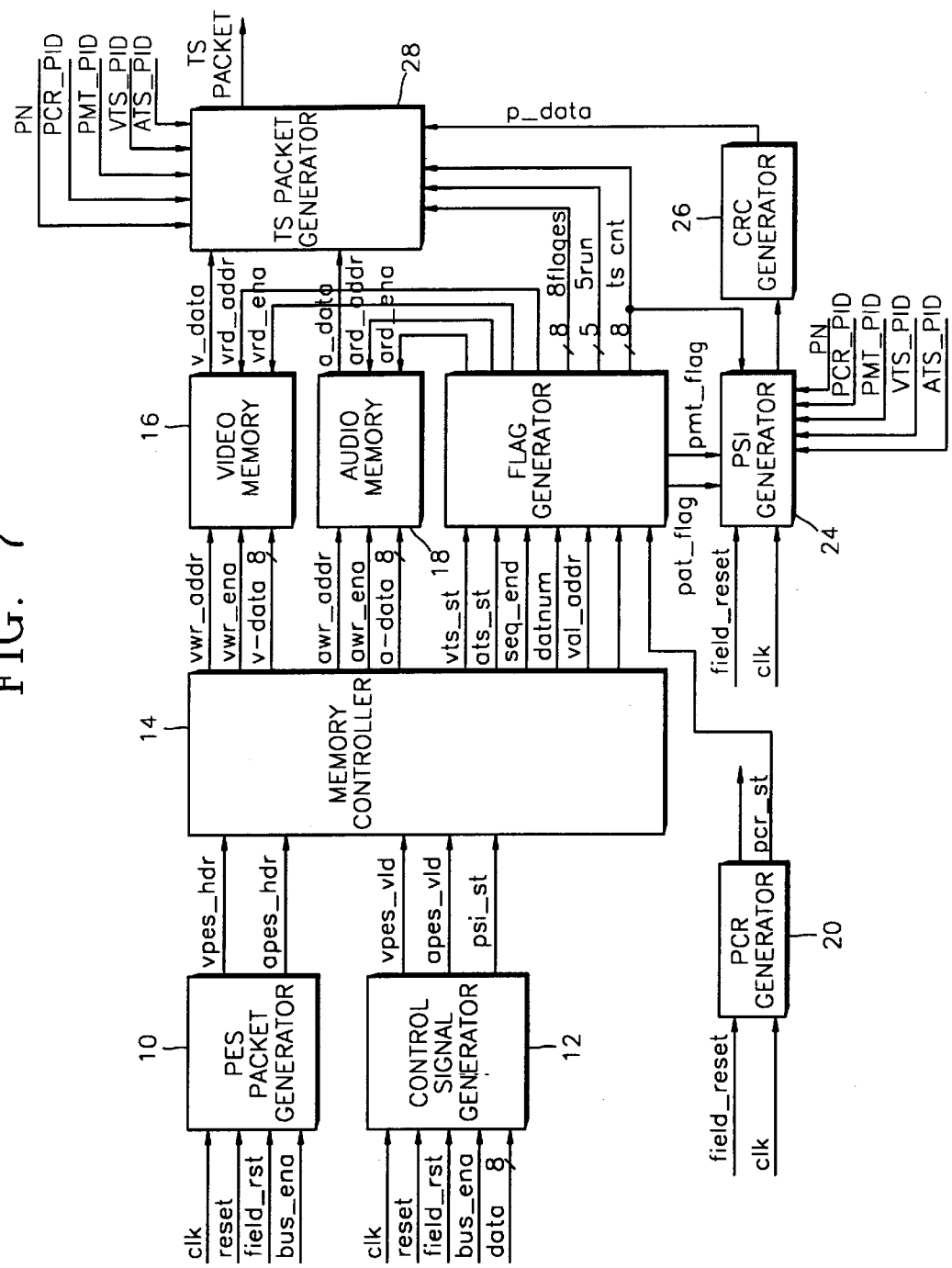
FIG. 7 is a detailed block diagram of a TS encoder according to the present invention.

FIG. 7 shows the detailed structure of the TS encoder according to the present invention. The apparatus shown in FIG. 7 includes a PES packet generator 10, a control signal generator 12, a memory controller 14, a video memory 16, an audio memory 18, a program clock reference (PCR) generator 20, a flag generator 22, a PSI generator 24, a CRC generator 26, and a TS packet generator 28.

The PES packet generator 10 generates a PES packet header in units of fields according to a clock signal (clk), a reset signal (reset), a field reset signal (field_rst), and a bus enable signal (bus_ena). The PES packet generator 10 is informed that a field starts in an elementary stream by the field reset signal (field_rst) and generates the PES header shown in FIG. 2 with respect to every field, N clock signals after the field reset signal (field_rst). The PES packet generator 10 generates header signals (vpes_hdr and apes_hdr) with respect to the video and the audio, respectively.

The PES packet generator 10 generates the PES packet by inserting the elementary stream into the PES header.

The control signal generator 12 generates video and audio valid period signals (vpes_vld and apes_vld) which show the valid period of the PES header generated by the PES packet generator 10, respectively, according to the clock signal (clk), the reset signal (reset), the field reset signal (field_rst), the bus enable signal (bus_ena), and data (data 8). Since the PES packet header is generated N clock signals after the field reset signal (field_rst), the control signal generator 12 designates the effective periods of the audio and video with respect to each field. Also, the control signal generator 12 generates PSI signal (psi_st) for displaying a period for inserting PSI information, and inserts the PSI packet into every field.

The memory controller 14 generates a control signal for writing data in the audio and video memories 16 and 18, and a control signal for generating the TS packet. The memory controller 14 generates address signals (vwr_address and awr_address) and enable signals (vwr_ena and awr_ena) in order to record audio and video data in the audio and video memories 16 and 18.

Since each of the audio and video has its own PID, the audio and video must be generated to be different TS packets.

PCR is added to the packet which is positioned at the beginning of each field. An adaptation field for adding the PCR is included in the packet. The PCR is inserted only once into an adaptation field included in each field. Therefore, the memory controller 14 generates audio and video stream signals (vts_st and ats_st) for inserting the PCR into the adaptation fields of the video and audio data.

When a sequence end code that shows the last data of a field is detected in the PES packet generated by the PES packet generator 10, the memory controller 14 outputs data number information to the flag generator 22. At this time, the memory controller 14 transmits the actually recorded valid address.

When one TS packet does not consist of the last data of one field (for example, when the amount of data of one transport packet is smaller than 184 bytes), an adaptation field into which stuffing data is to be inserted must be included. The stuffing data is inserted into the adaptation field using the sequence end code.

The PCR generator 20 generates a PCR signal (pcr_st) for generating the PCR by the clock signal clk and a field reset signal field_rst. The PCR, which is a signal for maintaining the same time condition between an encoder and a decoder, is generated by a 27 MHz clock signal.

The flag generator 22 generates audio and video address signals (v_addr and a_addr) for reading the video and audio data stored in the video and audio memories 16 and 18, and PAT and PMT flags (pat_flag and pmt_flag) for generating the TS packet with reference to the audio and video stream signals (vts_st and ats_st), the PCR signal pcr_st, the sequence end signal (seq_end), the data number information (datnum), and the valid address (valid_addr), which are input from the memory controller 14 and the PCR generator 20. However, the flag generator 22 is controlled so that the audio packet is not generated when the video packet is generated and the video packet is not generated when the audio packet is generated, using counters 1 through 188 inside the flag generator 22. At this time, the flag generator 22 secures timing for generating PSI data and generates the PAT and PMT flags (pat_flag and pmt_flag). The PAT and PMT flags (pat_flag and pmt_flag) are input to the PSI generator 24 which then generates real PSI data.

The flag generator 22 generates 8 flags (8 flags), 5 runs (5 run), and a TS count signal (ts_cnt), and transmits the 8 flags, the 5 runs, and the TS count to the TS packet generator 28.

The PSI generator 24 generates the PSI packet in units of fields from the field reset signal (field_reset). At this time, the PSI packet consists of the PAT packet and the PMT packet as shown in FIGS. 4 and 5. The PAT packet and the PMT packet are generated by a program number (PN), PCR PID (PCR_PID), PMT PID (PMT_PID), VTS (VTS_PID), and ATS PID (ATS_PID). The program number (PN) and the PMT PID (PMT_PID) are used for the PAT packet.

The CRC generator 26 adds CRC of 32 bits to the PSI packet generated by the PSI generator 24 and outputs the addition result as p-data. A polynomial used here is $X^{32}+X^{26}+X^{23}+X^{22}+X^{16}+X^{12}+X^{11}+X^{10}+X^8+X^7+X^5+X^4+X^2+X+1$.

The TS packet generator 28 receives the 8 flags (8 flags) generated by the flag generator 22, the Program Number (PN), the PCR PID (PCR_PID), PMT PID (PMT_PID), VTS(VTS_PID), and ATS PID (ATS_PID), and adds the TS header to the data (v_data and a_data) read from the video memory 16 and the audio memory 18, and generates the TS packet. At this time, the 8 flags (8 flags) are signals important to forming the TS packet. The respective flags will now be described.

1) a PCR flag (pcr_flag) denotes the timing at which the PCR is to be inserted when the TS packet is generated. The TS packet has an adaptation field when the PCR flag (pcr_flag) exists.

2) a PTS flag (pts_flag) denotes the timing at which the PTS, that is a value for denoting the time to actually display a video signal, must be inserted in the PES packet. At this time, the PTS is obtained by adding the PCR value+N to the time at which the TS packet is generated.

3) a VPES flag (vpes_flag) denotes the timing at which the payload unit start indicator of the video TS packet is to be set as "1".

4) an APES flag (apes_flag) denotes the timing at which the payload unit start indicator of the audio TS packet is to be set as "1".

5) a PAT flag (pat_flag) denotes the timing at which the PAT packet shown in FIG. 4 is generated. The payload_unit start indicator of the PMT packet must be set as "1".

6) a PMT flag (pmt_flag) denotes the timing at which the PMT packet shown in FIG. 5 is generated. The payload unit start indicator of the PMT packet must be set as "1".

7) an ATS flag (ats_flag) denotes the timing at which the audio packet is generated.

8) a VTS flag (vts_flag) denotes the timing at which the video packet is generated.

Five runs (5 run) control the respective packets, that is, the PAT, PMT, video, and audio packets so that they are not simultaneously created. The null packet shown in FIG. 6 is generated in the remaining periods, excluding the period in which the TS packet is created by the audio and video stream signals (vts_st and ats_st) and the PSI signal (psi_st).

As mentioned above, in the TS encoder according to the present invention, one PES packet is constituted of one field. Accordingly, in the TS encoder according to the present invention, the size of hardware can be reduced by constructing a bitstream having a magnitude such that the length of one PES packet is not uniform and the length of the PES packet cannot be expressed by 16 bits in units of fields.

Also, since the PCR is inserted in units of fields, the timing of the TS packet can be solved by the field reset signal.

When the PES packet is constituted in units of fields, it is possible to edit the TS packet in units of fields by the payload unit start indicator (PUSI) of the TS packet.

The elementary stream encoded in units of fields starts from a sequence start code and ends with a sequence end code. Therefore, when one TS packet does not include the last data of one field, stuffing data must be inserted into the adaptation field. At this time, when a sequence end code is detected, the adaptation data can be inserted into the adaptation field using a 512 byte memory instead of a one field memory.

While this invention has been particularly shown and described with reference to preferred embodiments thereof, it will be understood by those skilled in the art that various changes in form and detail may be made therein without departing from the spirit and scope of the invention as defined by the appended claims.

What is claimed is:

1. A transport stream (TS) encoding method for receiving an MPEG elementary stream and generating a transport stream, comprising the steps of:

(a) generating a packetized elementary stream (PES) header in units of fields of the elementary stream;

(b) generating a PES header valid period signal for denoting the valid period of the PES header generated in the step (a) in units of fields of the elementary stream;

(c) recording the PES header generated in the step (a) and the elementary stream in synchronization with the PES header valid period signal generated in the step (b);

(d) generating a transport stream (TS) header period signal for denoting a period in which the TS header is to be recorded;

(e) reading the PES header generated in the step (a) and the elementary stream in synchronization with the TS header period signal generated in the step (d); and (f) generating the TS packet by adding the TS header to the PES header read in the step (e) and to the elementary stream, according to the timing at which the TS header is to be recorded.

2. The method of claim 1, further comprising the step of inserting a program clock reference (PCR) into a packet in units of fields when a transport stream is generated in units of fields.

3. The method of claim 2, further comprising the steps of inserting an adaptation field into a first TS packet and inserting a PCR into the adaptation field when a transport stream is generated in units of fields.

4. A transport stream (TS) encoder for receiving an MPEG elementary stream and generating a transport stream, comprising:

a packetized elementary stream (PES) header generator for generating a PES header in units of fields of the elementary stream;

a control signal generator for generating a PES header valid period signal that shows the valid period of the PES header in units of fields;

a memory for recording and reading the PES header generated by the PES header generator and the elementary stream;

a memory controller for controlling the recording operation of the memory in synchronization with the PES header valid period signal generated by the control signal generator and generating a transport stream (TS) header period signal that shows a period in which a TS header is to be recorded;

a flag generator for controlling the reading operation of the memory in synchronization with the TS header period signal generated by the memory controller and generating a TS header flag that shows timing at which the TS header is to be recorded; and a TS packet generator for adding the TS header to data read from the memory in synchronization with the TS header flag and outputting a TS packet.

5. The TS encoder of claim 4, wherein the PES header generator and the control signal generator operate in synchronization with a field reset signal that shows the head of a field.

6. The TS encoder of claim 4, wherein the control signal generator generates a sequence end signal and data on the number of the last data that shows the presence of the last data in an elementary stream in units of fields, and wherein the flag generator controls the memory with reference to the sequence end signal and data on the number of the last data.

7. The TS encoder of claim 6, wherein the control signal generator generates a final address signal that shows the address of the last data in an elementary stream in units of fields, and wherein the flag generator controls the memory with reference to the final address signal.

8. The TS encoder of claim 4, wherein the TS generator generates a null packet in a period where the TS packet is not created.

9. The TS encoder of claim 4, further comprising a program clock reference (PCR) generator for generating a PCR data stream and a PCR period signal that shows a period in which the PCR is to be recorded in units of fields, wherein the flag generator generates a PCR flag that shows the timing at which the PCR is to be recorded in synchronization with the PCR period signal, and wherein the TS generator inserts the PCR data provided by the PCR generator according to the PCR flag.

10. The TS encoder of claim 9, further comprising a PSI generator for generating program specification information (PSI) data in units of fields of the elementary stream, and a CRC generator for adding an error correcting code, wherein the flag generator generates a PSI flag that shows the timing at which the PSI data is to be recorded, and wherein the TS generator generates a PSI packet to which the error correcting code provided by the CRC generator is added according to the PSI flag.

* * * * *